(12) United States Patent
Ricciulli

(10) Patent No.: US 6,816,910 B1
(45) Date of Patent: Nov. 9, 2004

(54) METHOD AND APPARATUS FOR LIMITING NETWORK CONNECTION RESOURCES

(75) Inventor: Livio Ricciulli, Los Gatos, CA (US)

(73) Assignee: NetZentry, Inc., Palo Alto, CA (US)

( * ) Notice: Subject to any disclaimer, the term of this patent is extended or adjusted under 35 U.S.C. 154(b) by 630 days.

(21) Appl. No.: 09/789,477

(22) Filed: Feb. 20, 2001

Related U.S. Application Data

(60) Provisional application No. 60/183,305, filed on Feb. 17, 2000.

(51) Int. Cl.[7] .............................................. G06F 15/16
(52) U.S. Cl. ...................... 709/237; 709/227; 709/229; 709/239; 709/249; 370/216; 370/236; 370/242; 370/400
(58) Field of Search ................................ 709/200–202, 709/223–229, 237–242, 248–249; 718/102, 104; 370/216–217, 235–238, 241–245, 351, 400–401, 408

(56) References Cited

U.S. PATENT DOCUMENTS

| | | | | |
|---|---|---|---|---|
| 5,128,871 A | * | 7/1992 | Schmitz ........................ | 716/17 |
| 5,233,604 A | * | 8/1993 | Ahmadi et al. .............. | 370/238 |
| 5,442,750 A | * | 8/1995 | Harriman, Jr. et al. ..... | 709/237 |
| 5,970,064 A | * | 10/1999 | Clark et al. .................. | 709/249 |
| 6,115,745 A | * | 9/2000 | Berstis et al. ................ | 709/227 |
| 6,167,025 A | * | 12/2000 | Hsing et al. ................. | 370/216 |
| 6,202,084 B1 | * | 3/2001 | Kumar et al. ............... | 709/237 |
| 6,314,093 B1 | * | 11/2001 | Mann et al. ................. | 370/351 |
| 6,314,464 B1 | * | 11/2001 | Murata et al. .............. | 709/226 |
| 6,347,339 B1 | * | 2/2002 | Morris et al. ............... | 709/237 |

* cited by examiner

Primary Examiner—Bharat Barot
(74) Attorney, Agent, or Firm—Swernofsky Law Group PC

(57) ABSTRACT

Various embodiments include methods and apparatuses limit connection resources at one or more first network nodes. In one method embodiment, at a second network node, a handshake message is detected; a pending network connection is randomly selected; and a message to end the randomly selected pending network connection is sent from the second node. Various embodiments have one or more elements that can begin if a total of pending network connections exceeds a threshold. In one apparatus embodiment, a packet sniffer component detects a handshake message; a random selection component is coupled to the packet sniffer and randomly selects a pending network connection; and a sending component is coupled to the random selection component and sends a message to end the randomly selected pending network connection. Various embodiments have one or more elements that can begin if a total of pending network connections exceeds a threshold.

148 Claims, 5 Drawing Sheets

METHOD AND APPARATUS FOR LIMITING NETWORK CONNECTION RESOURCES

CROSS REFERENCE TO RELATED APPLICATION

This application claims the benefit of prior U.S. Provisional Application No. 60/183,305 filed on Feb. 17, 2000 which application is hereby incorporated herein by reference.

BACKGROUND OF THE INVENTION

1. Field of the Invention

The field relates to limiting network connection resources. More particularly, the field relates to defending against denial of service attacks.

2. Description of Related Art

Two examples of widely used Transmission Control Protocol (TCP)-based protocols are hypertext transfer protocol (HTTP) and file transfer protocol (FTP). These two protocols are becoming more important for the exchange of information over the Internet and are affected by the "SYN flooding" type of denial-of-service attack. A denial-of-service attack on an Internet network by TCP "SYN flooding" hinders the signaling mechanism, called "handshaking," that is used to establish TCP connections. When such an attack occurs, the affected network resources, such as an Internet server, are degraded in their ability to handle message traffic, resulting in a denial-of-service condition.

A client computer and a server computer can establish a virtual connection using Transmission Control Protocol/Internet Protocol (TCP/IP) via handshaking, such as three-way handshaking. FIG. 1 shows an example of three-way handshaking 100. The client sends a SYN packet message. The server sends back to the client a SYN-ACK packet, acknowledging the receipt of the first packet. The client then sends an ACK packet to the server, acknowledging receipt of the server's SYN-ACK packet. When the server receives the ACK packet, the handshaking process is complete and the communication connection is established. Thus, during the TCP/IP handshaking process, the server expects to receive two packets from the client (the SYN packet and the ACK packet) to establish a connection.

The "SYN flood" attack takes advantage of the TCP/IP handshaking process by sending numerous SYN packets with false ("spoofed") return addresses to a communications port on a server. FIG. 2 shows an example of a denial of service attack 200. The server sends out a SYN-ACK message to each return address for each of these SYN packets. The SYN-ACK message is simply lost in the network. The server never receives any ACK messages back because there are no client systems at the spoofed return addresses. The server, therefore, keeps waiting in vain for an ACK message and may keep a queue entry allocated, for example, for several seconds. In sending out the SYN-ACK messages, the server uses up memory resources and queues a half-open connection for each spoofed SYN message. After a predetermined waiting period, the server times out waiting for a SYN message and closes the corresponding half-open connection. On many systems the time out values are on the order of approximately one second, so the server's connection request queue can be depleted relatively slowly. After the server has enough half-open connections to fill up its queue, the server will start to drop subsequent SYN messages, such that legitimate SYN connection requests start to be ignored. On certain systems, the allowable half-open connection queue space may be as little as eight connections.

Thus, SYN flooding attacks reduce (or eliminate) the ability of the targeted server system to respond to legitimate connection requests. An attacker can generally leisurely fill the server's connection request queue before earlier SYN messages reach a time out condition. The SYN flooding denial-of-service attack, if not dealt with properly, requires very little computation and bandwidth commitment from malicious users. Although SYN flooding requires an attacker to continuously flood a target system (otherwise within a few minutes the target will revert to normal operation), it is difficult to trace to the source of the SYN packets. Thus, the SYN flooding technique remains a viable attack.

Potential loss of revenue caused by preempting reliable TCP communications is enormous, and therefore adequate mechanisms for dealing with SYN flooding are needed. Current SYN flooding defense mechanisms seem to have greatly mitigated the problem by making it harder for an attacker to negatively affect service. The most popular approach uses a "brute force" technique. In this approach, the TCP "connection pending" data structure (implementing the connection request queue) is made sufficiently large that an average attacker, to be successful, would need to flood connection requests at a rate exceeding reasonable bandwidth capabilities. This solution, although sometimes very practical, requires large amounts of protected kernel memory and may slow down the server response time for looking up connections in the vast "connection pending" data structure. Other less popular techniques use one-way hash functions (with Internet "cookies") to verify the authenticity of connection requests and therefore eliminate unnecessary memory allocation. Some of these latter techniques can introduce changes in the TCP signaling behavior and are therefore less favored. Firewall approaches actively monitor the TCP signaling traffic to detect possible attacks and inject ad-hoc signaling messages in the network to mitigate the denial-of-service attack. These approaches are awkward because they introduce additional administrative complexity, may introduce significant delays for legitimate connection establishment, or may expose the system to different, though arguably less severe, kinds of vulnerabilities.

No one mechanism seems to provide an optimal solution, and thus a careful protection approach is usually constructed by using a combination of techniques. What is needed is a solution that can complement or replace existing solutions.

SUMMARY OF THE INVENTION

Various embodiments include methods and apparatuses for limiting connection resources at one or more first network nodes.

One embodiment is a method. At a second network node, a handshake message is detected. A pending network connection is randomly selected. A message to end the randomly selected pending network connection is sent from the second node. Various embodiments can have one or more elements that can begin if a total of pending network connections exceeds a threshold.

Another embodiment is an apparatus. A packet sniffer component detects a handshake message. A random selection component is coupled to the packet sniffer. The random selection component randomly selects a pending network connection. A sending component is coupled to the random selection component. The sending component sends a message to end the randomly selected pending network connection. Various embodiments have one or more elements that can begin if a total of pending network connections exceeds a threshold.

Another apparatus embodiment further comprises one or more servers of the first network node.

DETAILED DESCRIPTION OF SPECIFIC EMBODIMENTS

Figure 1:
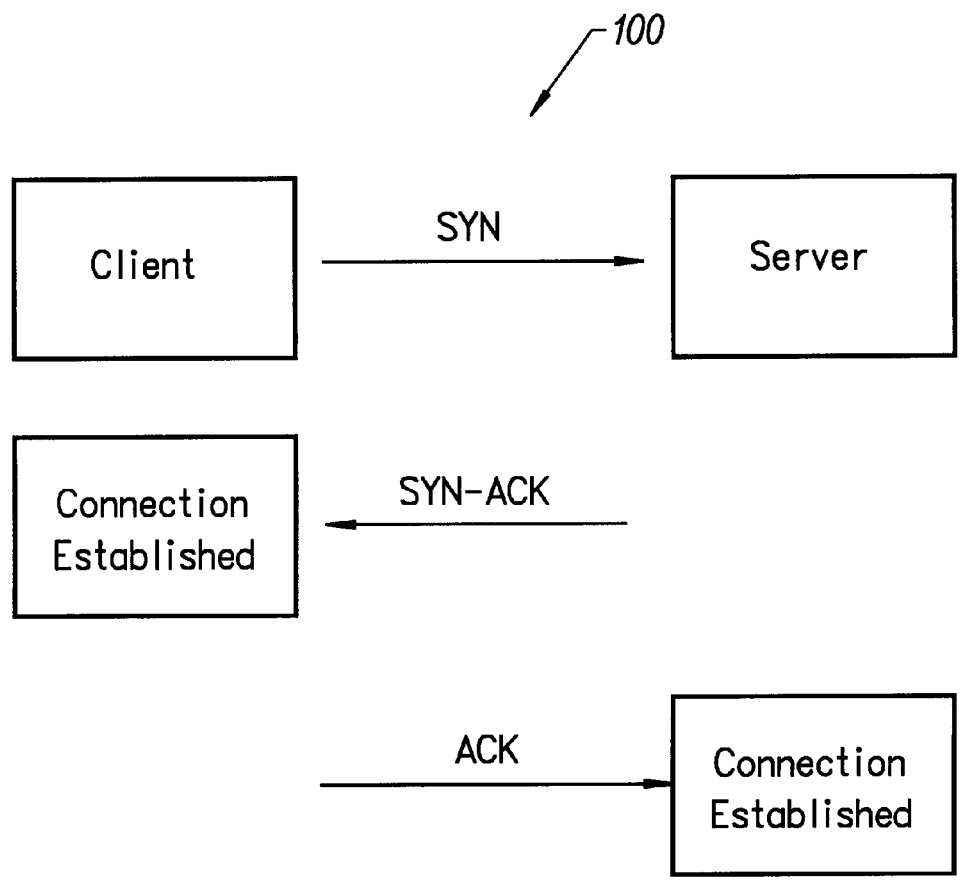
FIG. 1 shows an example of three-way handshaking.
Figure 2:
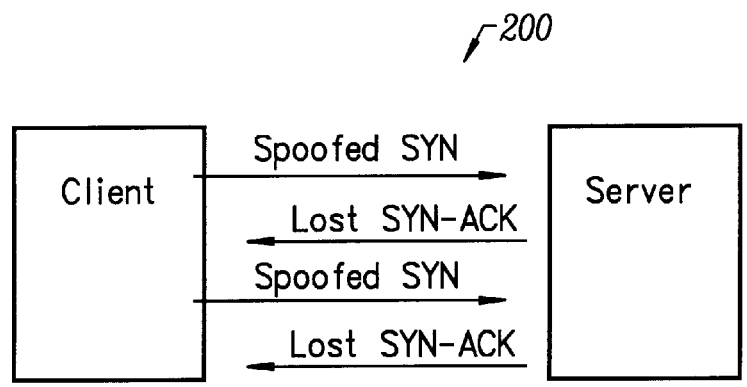
FIG. 2 shows an example of a denial of service attack.

In random drop embodiment, when a SYN message reaches a server with a full connection pending queue, it can replace one of the pending requests chosen at random. One example of a pending connection is a half-open connection, such as a connection where handshaking has started but not completed. The client whose connection entry is dropped can receive a RST message to notify it of the drop. If the replaced entry was previously generated by the attacker, the RST message can be lost in the network. If the replaced entry was from a legitimate client, the RST message can cause failure of the client's first attempt to communicate with the server (returning an end-of-file message). By making the queue large enough, a server under attack can still offer an arbitrarily high probability of successful connection establishment. The attacker can still occasionally deny connection establishment to a legitimate client. This scheme can be extremely resilient to very high bandwidth attacks (or coordinated attacks) or attacks carried out against clients with relatively small connection pending queues.

In some embodiment, connection pending entries when the queue is filled by SYN requests can be randomly dropped. In one embodiment, the server can replace at random one of the entries in the queue and can let the client time out and can later retry the connection with another SYN.

To maximize the overall response time of a server under attack, other embodiments have the server send a RST message to the client. With this addition, if a client's SYN entry happens to be dropped by the server, the client can be notified immediately with an EOF signal at the application level. Subsequently, the client can retry the connection establishment until the connection goes through. A client can be guaranteed connection establishment under most conditions.

In some embodiments, the rate of successful connection establishment $C_{good}$ in a random drop scheme can be modeled as:

$$C_{good} = R_{good}(1-1/q)^{(Rgood+Rbad)T}$$

where $R_{good}$ and T are the average rate of arrival and the average round-trip time of all clients attempting a connection to the server, q is the size of the connection pending queue, and $R_{bad}$ is the constant rate at which SYN packets with spoofed source addresses arrive to the server. The expression $(1-1/q)$ is the probability that a new arrival will not cause an existing entry to be dropped. Because each arrival can be statistically independent, by elevating $(1-1/q)$ to the power of the number of expected arrivals during the servicing of the requests $((R_{good}+R_{bad})T)$, one can find the probability that a legitimate request will succeed.

For a queue of size 1, a 100% success rate can be predicted for the legitimate users. For this reason q can be defined as the size of the connection pending queue plus 1. The equation above may not take into account the fact that spoofed TCP SYN packets can expire after approximately 70 seconds, thus freeing some queue space. Such factors can have a relatively small impact on the estimate of $C_{good}$ and, therefore, various embodiments following the above equation can still be treated as incorporating such factors.

The above estimate can be pessimistic by not taking into account that, when successful connections are completed, entries can be removed from the queue to mitigate the replacement probability. This can be modeled with the expression:

$$C_{good} = R_{good}(1-1/q)^{(Rgood+Rbad-Cgood)T}$$

which reduces the frequency at which connections are randomly knocked out by the rate of success $C_{good}$.

Various embodiments can provide a defense against the SYN flooding denial of service attack. Various embodiments can help allow a client to access a server, even during a sustained SYN flooding attack. Some embodiments can be implemented on a computer detached from the server the computer is defending. Some embodiments can capture all or many packets sent to the server, and can send packets to the server. Various embodiments can learn an optimal threshold for intervening in the defense by monitoring the average operation of the server. Some embodiments can protect multiple servers by capturing all, or many, packets destined to each of the protected servers, and sending packets to each of the protected servers. Some embodiments can be implemented in user memory space, and/or without requiring modifications to the software and/or hardware of the servers and/or client(s). Various embodiments can coexist with other SYN flooding defense systems. Some embodiments can be distributed across multiple detached computers, each assigned a distinct set of one or more servers and/or one or more port numbers to protect.

Figure 3:
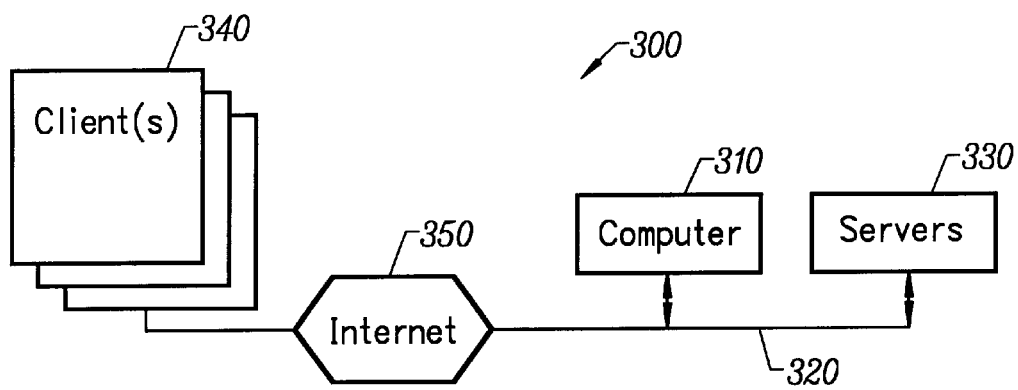
FIG. 3 is a diagram of one embodiment for limiting connection resources.

FIG. 3 shows one embodiment for limiting connection resources 300. A computer 310 is coupled via a network 320 to one or more servers 330. Various embodiments have different types of the network 320, such as a local area network, wide area network, or an internetwork. In one embodiment, if the network 320 is a local area network, the computer 310 and the servers 330 can share a same broadcast network, such as the same Ethernet segment. The computer 310 and the servers 330 are coupled to the one or more clients via a network 350. Various embodiments have different types of the network 350. The shown embodiment uses for the network 350 one example of an internetwork, the Internet. The computer 310 implements a random "early drop" scheme. The servers 330 may or may not be aware of the random "early drop" scheme. Various embodiments can position a packet sniffer component, a random selection component, and a sending component at one or more software modules executing on one or more circuits, and/or at one or more circuits without software. The circuits can be electrical, magnetic, and/or optical, and can be positioned at one or more computers.

The computer 310 captures all, or many, TCP packets being transmitted on the network 320 to the servers 330 being protected and proactively processes the packets to avoid filling up the connection pending queue of the protected servers 330. A running total can be kept of outstanding SYN packets (SYN packets that have not yet been acknowledged by the clients 340) and a TCP reset message can be sent by the sending component to the servers 330 in order to keep the total of all outstanding SYN packets under a predetermined threshold value. In one embodiment, when the computer 310 captures a packet that indicates an acknowledge (ACK) from a client 340, the client source or return address is recorded and used to avoid capturing future packets from that client. In some embodiments, additional computers 310 can be deployed at various network locations, permitting scaling upward to the meet the requirements of the servers 330 requiring protection from denial of service attacks.

Figure 4:
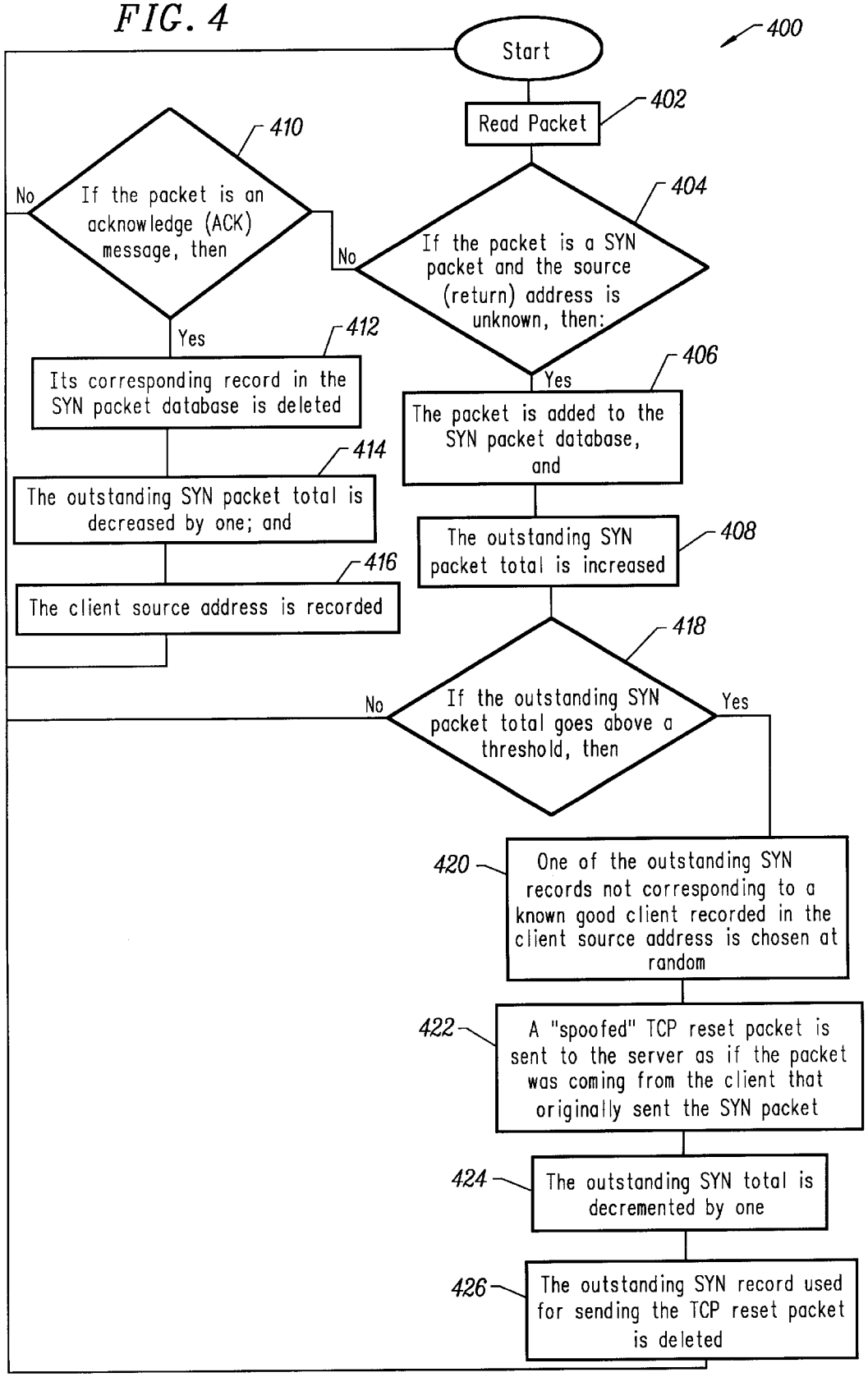
FIG. 4 is an exemplary flowchart of an embodiment for limiting connection resources.

FIG. 4 shows an exemplary flowchart 400 of an embodiment for limiting connection resources. Various embodiments can alter, add to, delete from, and/or reorder elements of the flowchart 400. At 402, a TCP packet is read. At 404, if the packet is a SYN packet and the source (return) address is unknown, then at 406 the packet is added to the SYN packet database, and at 408 the outstanding SYN packet total is increased. If the 404 result is no, then 410 is next. At 410, if the packet is an acknowledge (ACK) message, then at 412 its corresponding record in the SYN packet database is deleted, at 414 the outstanding SYN packet total is decreased by one, and at 416 the client source address is recorded. Following 408, at 418, if the outstanding SYN packet total goes above a threshold 420 is next. At 420, one of the outstanding SYN records not corresponding to a known good client recorded in 416 is chosen at random. At 422, a "spoofed" TCP reset packet is sent to the server from the sending component as if the packet was coming from the client that originally sent the SYN packet. At 424, the outstanding SYN total is decremented, for example by one. At 426, the outstanding SYN record used for sending the TCP reset packet is deleted.

Figure 5:
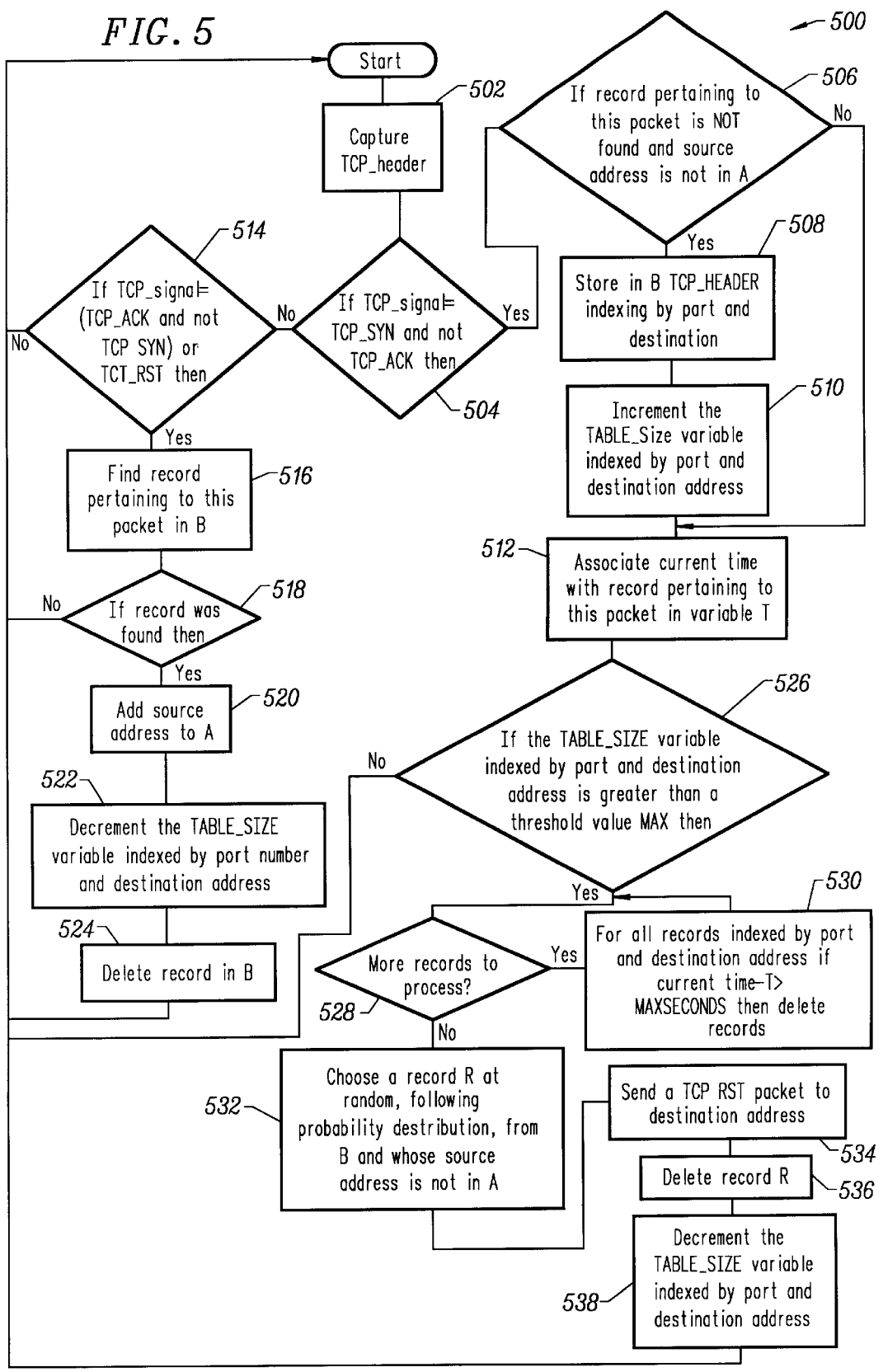
FIG. 5 is an exemplary flowchart of another embodiment for limiting connection resources.

FIG. 5 is an exemplary flowchart 500 of another embodiment for limiting connection resources. Various embodiments can alter, add to, delete from, and/or reorder elements of the flowchart 500.

In the flowcharts 500 and 600, TCP_SYN (synchronize), TCP_ACK (acknowledge), and TCP_RST (reset) are the signaling flags in the TCP message header that is detected by the packet sniffer component, database B can be a database of the observed traffic which optimizes the retrieval operation by indexing its content, database A can be a database of clients that have sent at least an ACK message, TABLE_SIZE can be a set of counters associated to a set of port numbers for each destination address, and MAX can be set to a value that is optimal for the particular server 330 that the computer 310 is protecting. Flags can have a set value, such as 1, or a reset value, such as 0. The flag values are arbitrary and can be swapped.

At 502, TCP_header is captured. At 504, if TCP_signal= TCP_SYN and not TCP_ACK, then 506 is next, else 514 is next. At 506, if the record pertaining to this packet is NOT found and source address is not in database A, then 508 is next. At 508, TCP_HEADER is stored in database B, indexing by port and destination address. At 510, the TABLE_SIZE variable, indexed by port and destination address, is incremented. At 512, current time is associated with record pertaining to this packet in variable T, and 526 is next.

At 514, if TCP_signal=(TCP_ACK and not TCP SYN) or TCP_RST, then 516 is next. At 516, record is found pertaining to this packet in database B. At 518, if record was found, then 520 is next. At 520, source address is added to database A. At 524, the TABLE_SIZE variable, indexed by port number and destination address, is decremented. At 524, record is deleted in database B.

At 526, if the TABLE_SIZE variable, indexed by port and destination address, is greater than a threshold value MAX, then 528 is next. At 528, if there are more records to process, then 530 is next, else 532 is next. At 530, for all records, indexed by port and destination address, if current time−T> MAXSECONDS then records are deleted. At 532, a record R is chosen at random, following a probability distribution, from database B whose source address is not in database A. The probability distribution can be uniform and/or nonuniform across the records. In other embodiments, the source address can be in database A. At 534, a TCP RST packet is sent to destination address. At 536, record R is deleted. At 538, the TABLE_SIZE variable, indexed by port and destination address, is decremented.

In other embodiments, other indexing of data and/or in different combinations can be used.

In other embodiments, the plurality of pending network connections can be distinguished as belonging to a first subplurality or a second subplurality. Each of the first and second subpluralities can have a size equal to or less than a size of the plurality of pending network connections. A pending network connection to be ended can be randomly selected from the second subplurality or substantially the second plurality. In various embodiments, a pending network connection can belong to the first subplurality or the second subplurality based on one or more factors such as presence or absence of historical data, and/or historical data having or not having a first and/or second characteristic.

Figure 6:
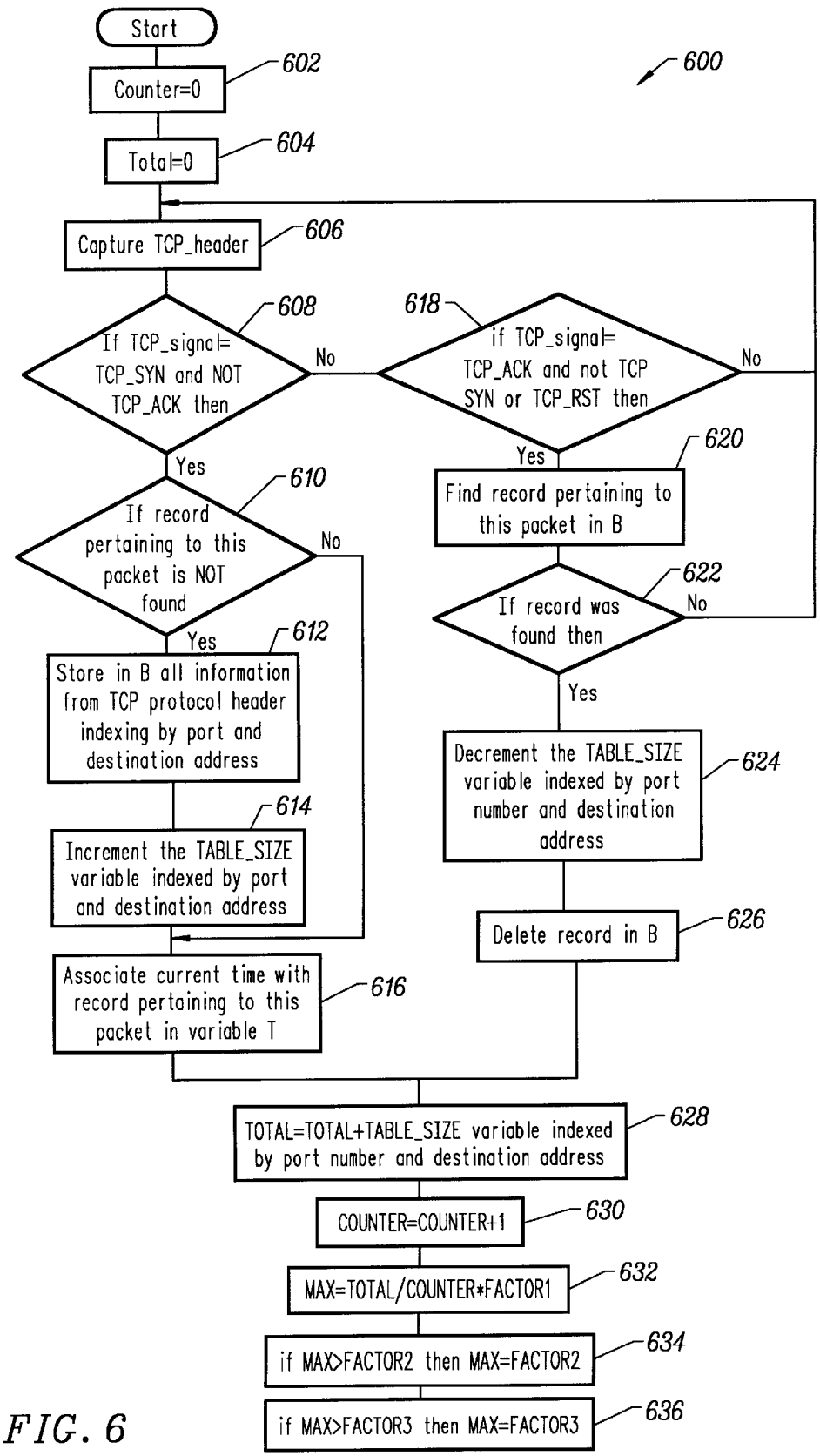
FIG. 6 is an exemplary flowchart of an embodiment for determining a threshold for a total number of pending network connections.

FIG. 6 is an exemplary flowchart 600 of an embodiment for determining a threshold for a total number of pending network connections, or the variable MAX. Various embodiments can alter, add to, delete from, and/or reorder elements of the flowchart 600.

In the flowchart 600, the variables TOTAL and COUNTER can be values, for example integers; and FACTOR1, FACTOR2, and FACTOR3 can be, for example, administratively set operating values.

At 602, COUNTER=0. At 604, TOTAL=0. At 606, TCP_ header is captured. At 608, if TCP_signal=TCP_SYN and NOT TCP_ACK, then 610 is next, else 618 is next. At 610, if record pertaining to this packet is NOT found, then 612 is next. At 612, all information from TCP protocol header, indexing by port and destination address, is stored in database B. At 614, the TABLE_SIZE variable, indexed by port and destination address, is incremented. At 616, current time is associated with record pertaining to this packet in variable T.

At 618, if TCP_signal=TCP_ACK and not TCP SYN or TCP_RST then 620 is next. At 620, record pertaining to this packet is found in database B. At 622, if record was found, then 624 is next. At 624, the TABLE_SIZE variable, indexed by port number and destination address, is decremented. At 626, record in B is deleted.

At 628, TOTAL=TOTAL+TABLE_SIZE variable, indexed by port number and destination address. At 630, COUNTER=COUNTER+1. At 632, MAX=TOTAL/ COUNTER*FACTOR1. At 634, if MAX>FACTOR2 then MAX=FACTOR2. At 636, if MAX<FACTOR3 then MAX= FACTOR3.

In other embodiments, other indexing of data and/or in different combinations can be used.

In a proactive embodiment, adequate monitoring of the network traffic can detect patterns that indicate a possible attempt to deny service through TCP flooding. Upon detection of the anomaly, the attacker can then be isolated from the network and prosecuted.

In some embodiments, the inter-domain cooperation necessary to trace an attacker may not be possible. In such situations, some local defense mechanisms can be adopted. In this more reactive approach, the malicious requests are allowed to reach the target server, which can react to anomalous conditions and turn on specific mechanisms aimed at minimizing the impact of the denial-of-service attacks. Several such mechanisms each have tradeoffs with respect to effectiveness, robustness, and resource requirements.

One Internet cookie embodiment increases the capacity of storing outstanding connection pending entries, thus requiring that an attacker send a much greater number of SYN packets. This embodiment can increase the cost of an attack. The embodiment can require the server to devote more resources to prevent the SYN flooding attacks, and can be adequate to discourage attacks carried out by individuals with limited bandwidth at their disposal. Coordinated attacks or attacks carried out from high-bandwidth links can circumvent this defense embodiment. Although this cookie embodiment may not semantically solve the SYN flooding problem, it can defend large and heavy-weight TCP servers (like WWW servers) with large amounts of kernel memory space.

A "Linux cookie" embodiment can combine the incoming SYN packet's sequence number, and the source and destination addresses, with a secret number (which is changed at regular intervals), and run them through a one-way hash function. The resulting cookie can be the sequence number of the reply. The reply (SYN-ACK packet) can be then sent to the source, using the cookie. No record may be kept locally of the TCP connection request. If and when the ACK packet arrives from the source address as the third step of the handshake process, the sequence number of the received message can be used to authenticate the source. If the source can be properly authenticated, the connection can be established; otherwise, the ACK packet can be discarded.

The embodiment exchanges memory for CPU time. This can be a problem for e-commerce servers that need to devote as much CPU as possible to serve clients. This embodiment can break TCP semantics by not letting the server retransmit SYN-ACK packets in case of packet loss. The initial round trip time measurement and the incoming maximum segment size can be lost, though this can be circumvented.

Another cookie embodiment can, while not requiring changes to TCP semantics, allow a server under attack to establish security associations with clients before TCP connection requests are processed. In this embodiment, when the server is under attack and receives a SYN packet, it can see if the client had previously established a security association. If the client has a security association, the SYN can be processed normally. If not, the server can create a security association with the client and can discard the received SYN. The creation of the security association can be triggered by the server. The server can send to the client an illegal SYN-ACK message with its sequence number replaced by a cookie.

In this embodiment, according to the standard TCP specifications, the client can respond to the anomalous SYN-ACK packet with a TCP reset (RST) packet bearing the server's cookie. When the server receives the reset packet, it can verify the cookie and can record a security association with that particular client. This embodiment can be backward compatible, and may not permit the unwarranted allocation of resources on the server (the number of security associations can be proportional to the number of good clients), but can significantly increase the first connection setup time. Servers with a small turn-around time with millions of clients like popular WWW services may significantly reduce their response time.

Various embodiments can comprise elements coupled together physically and/or functionally. The various embodiments of the structures and methods that are described above are illustrative only and do not limit the scope to the particular embodiments described. For example, in view of this disclosure, those skilled in the art can define other variable names, data structures, protocols, etc., and/or other software and/or hardware to use these alternative features, creating a method or apparatus such as a software and/or hardware apparatus. The following claims cover such alternatives.

What is claimed is:

1. A method of limiting connection resources at a first network node, comprising:
   detecting, at a second network node, a handshake message sent via at least a first network from a third network node toward the first network node;
   randomly selecting one of a plurality of pending network connections at the first network node, the plurality of pending network connections started in response to a plurality of handshake messages sent toward the first network node via at least a second network; and
   sending from the second network node a message to end the randomly selected pending network connection.

2. The method of claim 1, wherein the handshake message and the plurality of handshake messages comprise Transmission Control Protocol data comprising a synchronize flag having a set value.

3. The method of claim 1, wherein each of the plurality of pending network connections waits, to complete handshaking, for Transmission Control Protocol data comprising an acknowledge flag having a set value.

4. The method of claim 1, wherein the detecting comprises sniffing.

5. The method of claim 1, wherein the message to end the randomly selected pending network connection comprises Transmission Control Protocol data comprising a reset flag having a set value.

6. The method of claim 1, wherein the first network is a local area network.

7. The method of claim 1, wherein the first network is a wide area network.

8. The method of claim 1, wherein the first network is an internetwork.

9. The method of claim 1, wherein the second network is an internetwork.

10. The method of claim 1, wherein the randomly selecting follows a probability distribution across the plurality of pending network connections.

11. The method of claim 10, wherein the probability distribution is uniform.

12. The method of claim 10, wherein the probability distribution is nonuniform.

13. The method of claim 1, wherein the message to end the randomly selected pending network connection comprises a spoofed network identifier of the third network node.

14. The method of claim 1, wherein the message to end the randomly selected pending network connection is sent if, in response to the detecting the handshake message, adding another pending network connection to the plurality of pending network connections causes a total of the plurality of pending network connections to exceed a threshold.

15. The method of claim 1, wherein the plurality of pending network connections comprises at least one of a first subplurality and a second subplurality, wherein the first subplurality comprises one or more pending network connections each started in response to one or more handshake messages sent from network nodes with which the first node has successfully handshaked, and the second subplurality comprises one or more pending network connections each started in response to one or more handshake messages sent from network nodes with which the first node has not successfully handshaked.

16. The method of claim 15, wherein the successfully handshaking comprises completing three-way handshaking.

17. The method of claim 15, wherein the randomly selecting is at least substantially limited to randomly selecting from the second subplurality.

18. The method of claim 15, wherein the randomly selecting is limited to randomly selecting from the second subplurality.

19. The method of claim 15, wherein a total of the plurality of pending network connections exceeds a total of the first subplurality.

20. The method of claim 15, wherein a total of the plurality of pending network connections exceeds a total of the second subplurality.

21. The method of claim 15, wherein a total of the plurality of pending network connections equals a total of the first subplurality.

22. The method of claim 15, wherein a total of the plurality of pending network connections equals a total of the second subplurality.

23. The method of claim 1, wherein the plurality of pending network connections comprises at least one of a first subplurality and a second subplurality, wherein the first subplurality comprises one or more pending network connections each started in response to one or more handshake messages sent from network nodes about which the first node has historical data, and the second subplurality comprises one or more pending network connections each started in response to one or more handshake messages sent from network nodes about which the first node does not have historical data.

24. The method of claim 23, wherein the randomly selecting is at least substantially limited to randomly selecting from the second subplurality.

25. The method of claim 23, wherein the randomly selecting is limited to randomly selecting from the second subplurality.

26. The method of claim 23, wherein a total of the plurality of pending network connections exceeds a total of the first subplurality.

27. The method of claim 23, wherein a total of the plurality of pending network connections exceeds a total of the second subplurality.

28. The method of claim 23, wherein a total of the plurality of pending network connections equals a total of the first subplurality.

29. The method of claim 23, wherein a total of the plurality of pending network connections equals a total of the second subplurality.

30. The method of claim 1, wherein the plurality of pending network connections comprises at least one of a first subplurality and a second subplurality, wherein the first subplurality comprises one or more pending network connections each started in response to one or more handshake messages sent from network nodes about which the first node has historical data having a first characteristic, and the second subplurality comprises one or more pending network connections each started in response to one or more handshake messages sent from network nodes about which the first node has historical data having a second characteristic.

31. The method of claim 30, wherein the randomly selecting is at least substantially limited to randomly selecting from the second subplurality.

32. The method of claim 30, wherein the randomly selecting is limited to randomly selecting from the second subplurality.

33. The method of claim 30, wherein a total of the plurality of pending network connections exceeds a total of the first subplurality.

34. The method of claim 30, wherein a total of the plurality of pending network connections exceeds a total of the second subplurality.

35. The method of claim 30, wherein a total of the plurality of pending network connections equals a total of the first subplurality.

36. The method of claim 30, wherein a total of the plurality of pending network connections equals a total of the second subplurality.

37. The method of claim 1, further comprising:
  successfully handshaking between the first network node and each of a plurality of network nodes; and storing a network identifier of each of the plurality of network nodes.

38. The method of claim 37, wherein the successfully handshaking comprises completing three-way handshaking.

39. The method of claim 37, wherein the network identifier comprises an Internet Protocol address.

40. The method of claim 37, wherein the network identifier comprises a Transmission Control Protocol port number.

41. The method of claim 37, wherein the plurality of pending network connections comprises at least one of a first subplurality and a second subplurality, wherein the first subplurality comprises at least one or more pending network connections started in response to a handshake message comprising a network identifier corresponding to a stored identifier, and the second subplurality comprises one or more pending network connections started in response to a handshake message comprising a network identifier not corresponding to a stored identifier.

42. The method of claim 41, wherein the randomly selecting is at least substantially limited to randomly selecting from the second subplurality.

43. The method of claim 41, wherein the randomly selecting is limited to randomly selecting from the second subplurality.

44. The method of claim 41, wherein the network identifier corresponds to the stored identifier if the network identifier maps to the stored identifier.

45. The method of claim 41, wherein the network identifier corresponds to the stored identifier if the stored identifier maps to the network identifier.

46. The method of claim 41, wherein a total of the plurality of pending network connections exceeds a total of the first subplurality.

47. The method of claim 41, wherein a total of the plurality of pending network connections exceeds a total of the second subplurality.

48. The method of claim 41, wherein a total of the plurality of pending network connections equals a total of the first subplurality.

49. The method of claim 41, wherein a total of the plurality of pending network connections equals a total of the second subplurality.

50. An apparatus for limiting connection resources at a first network node, comprising:
   a packet sniffer component adapted to be coupled to the first network node, wherein the packet sniffer detects a handshake message sent via at least a first network from a second network node toward the first network node;
   a random selection component coupled to the packet sniffer, wherein the random selection component randomly selects one of a plurality of pending network connections at the first network node, and the plurality of pending network connections are started in response to a plurality of handshake messages sent toward the first network node via at least a second network; and
   a sending component coupled to the random selection component, wherein the sending component sends a message to end the randomly selected pending network connection.

51. The apparatus of claim 50, wherein the handshake message and the plurality of handshake messages comprise Transmission Control Protocol data comprising a synchronize flag having a set value.

52. The apparatus of claim 50, wherein each of the plurality of pending network connections waits, to complete handshaking, for Transmission Control Protocol data comprising an acknowledge flag having a set value.

53. The apparatus of claim 50, wherein the packet sniffer component sniffs the handshake message.

54. The apparatus of claim 50, wherein the message to end the randomly selected pending network connection comprises Transmission Control Protocol data comprising a reset flag having a set value.

55. The apparatus of claim 50, wherein the first network is a local area network.

56. The apparatus of claim 50, wherein the first network is a wide area network.

57. The apparatus of claim 50, wherein the first network is an internetwork.

58. The apparatus of claim 50, wherein the second network is an internetwork.

59. The apparatus of claim 50, wherein the random selection component follows a probability distribution across the plurality of pending network connections.

60. The apparatus of claim 59, wherein the probability distribution is uniform.

61. The apparatus of claim 59, wherein the probability distribution is nonuniform.

62. The apparatus of claim 50, wherein the message to end the randomly selected pending network connection comprises a spoofed network identifier of the second network node.

63. The apparatus of claim 50, wherein the message to end the randomly selected pending network connection is sent if, in response to the detecting the handshake message, adding another pending network connection to the plurality of pending network connections causes a total of the plurality of pending network connections to exceed a threshold.

64. The apparatus of claim 50, wherein the plurality of pending network connections comprises at least one of a first subplurality and a second subplurality, wherein the first subplurality comprises one or more pending network connections each started in response to one or more handshake messages sent from network nodes with which the first node has successfully handshaked, and the second subplurality comprises one or more pending network connections each started in response to one or more handshake messages sent from network nodes with which the first node has not successfully handshaked.

65. The apparatus of claim 64, wherein the successfully handshaking comprises completing three-way handshaking.

66. The apparatus of claim 64, wherein the random selection component is at least substantially limited to randomly selecting from the second subplurality.

67. The apparatus of claim 64, wherein the random selection Component is limited to randomly selecting from the second subplurality.

68. The apparatus of claim 64, wherein a total of the plurality of pending network connections exceeds a total of the first subplurality.

69. The apparatus of claim 64, wherein a total of the plurality of pending network connections exceeds a total of the second subplurality.

70. The apparatus of claim 64, wherein a total of the plurality of pending network connections equals a total of the first subplurality.

71. The apparatus of claim 64, wherein a total of the plurality of pending network connections equals a total of the second subplurality.

72. The apparatus of claim 50, wherein the plurality of pending network connections comprises at least one of a first subplurality and a second subplurality, wherein the first subplurality comprises one or more pending network connections each started in response to one or more handshake messages sent from network nodes about which the first node has historical data, and the second subplurality comprises one or more pending network connections each started in response to one or more handshake messages sent from network nodes about which the first node does not have historical data.

73. The apparatus of claim 72, wherein the random selection component is at least substantially limited to randomly selecting from the second subplurality.

74. The apparatus of claim 72, wherein the random selection component is limited to randomly selecting from the second subplurality.

75. The apparatus of claim 72, wherein a total of the plurality of pending network connections exceeds a total of the first subplurality.

76. The apparatus of claim 72, wherein a total of the plurality of pending network connections exceeds a total of the second subplurality.

77. The apparatus of claim 72, wherein a total of the plurality of pending network connections equals a total of the first subplurality.

78. The apparatus of claim 72, wherein a total of the plurality of pending network connections equals a total of the second subplurality.

79. The apparatus of claim 50, wherein the plurality of pending network connections comprises at least one of a first subplurality and a second subplurality, wherein the first subplurality comprises one or more pending network connections each started in response to one or more handshake messages sent from network nodes about which the first node has historical data having a first characteristic, and the second subplurality comprises one or more pending network connections each started in response to one or more handshake messages sent from network nodes about which the first node has historical data having a second characteristic.

80. The apparatus of claim 79, wherein the random selection component is at least substantially limited to randomly selecting from the second subplurality.

81. The apparatus of claim 79, wherein the random selection component is limited to randomly selecting from the second subplurality.

82. The apparatus of claim 79, wherein a total of the plurality of pending network connections exceeds a total of the first subplurality.

83. The apparatus of claim 79, wherein a total of the plurality of pending network connections exceeds a total of the second subplurality.

84. The apparatus of claim 79, wherein a total of the plurality of pending network connections equals a total of the first subplurality.

85. The apparatus of claim 79, wherein a total of the plurality of pending network connections equals a total of the second subplurality.

86. The apparatus of claim 50, wherein the apparatus successfully handshakes between the first network node and each of a plurality of network nodes, and stores a network identifier of each of the plurality of network nodes.

87. The apparatus of claim 86, wherein successfully handshaking comprises completing three-way handshaking.

88. The apparatus of claim 86, wherein the network identifier comprises an Internet Protocol address.

89. The apparatus of claim 86, wherein the network identifier comprises a Transmission Control Protocol port number.

90. The apparatus of claim 50, wherein the plurality of pending network connections comprises at least one of a first subplurality and a second subplurality, wherein the first subplurality comprises at least one or more pending network connections started in response to a handshake message comprising a network identifier corresponding to a stored identifier, and the second subplurality comprises one or more pending network connections started in response to a handshake message comprising a network identifier not corresponding to a stored identifier.

91. The apparatus of claim 90, wherein the random selection component randomly selects at least substantially from the second subplurality.

92. The apparatus of claim 90, wherein the random selection component randomly selects from the second subplurality.

93. The apparatus of claim 90, wherein the network identifier corresponds to the stored identifier if the network identifier maps to the stored identifier.

94. The apparatus of claim 90, wherein the network identifier corresponds to the stored identifier if the stored identifier maps to the network identifier.

95. The apparatus of claim 90, wherein a total of the plurality of pending network connections exceeds a total of the first subplurality.

96. The apparatus of claim 90, wherein a total of the plurality of pending network connections exceeds a total of the second subplurality.

97. The apparatus of claim 90, wherein a total of the plurality of pending network connections equals a total of the first subplurality.

98. The apparatus of claim 90, wherein a total of the plurality of pending network connections equals a total of the second subplurality.

99. An apparatus for limiting connection resources at a first network node, comprising:
 means for detecting, at a second network node, a handshake message sent via at least a first network from a third network node toward the first network node;
 means for randomly selecting one of a plurality of pending network connections at the first network node, the plurality of pending network connections started in response to a plurality of handshake messages sent toward the first network node via at least a second network, wherein the means for randomly selecting is coupled to the means for detecting; and
 means for sending from the second network node a message to end the randomly selected pending network connection, wherein the means for sending is coupled to the means for detecting.

100. The apparatus of claim 99, wherein the handshake message and the plurality of handshake messages comprise Transmission Control Protocol data comprising a synchronize flag having a set value.

101. The apparatus of claim 99, wherein each of the plurality of pending network connections waits, to complete handshaking, for Transmission Control Protocol data comprising an acknowledge flag having a set value.

102. The apparatus of claim 99, wherein the means for detecting comprises sniffing.

103. The apparatus of claim 99, wherein the message to end the randomly selected pending network connection comprises Transmission Control Protocol data comprising a reset flag having a set value.

104. The apparatus of claim 99, wherein the first network is a local area network.

105. The apparatus of claim 99, wherein the first network is a wide area network.

106. The apparatus of claim 99, wherein the first network is an internetwork.

107. The apparatus of claim 99, wherein the second network is an internetwork.

108. The apparatus of claim 99, wherein the means for randomly selecting follows a probability distribution across the plurality of pending network connections.

109. The apparatus of claim 108, wherein the probability distribution is uniform.

110. The apparatus of claim 108, wherein the probability distribution is nonuniform.

111. The apparatus of claim 99, wherein the message to end the randomly selected pending network connection comprises a spoofed network identifier of the third network node.

112. The apparatus of claim 99, wherein the message to end the randomly selected pending network connection is sent if, in response to the detecting the handshake message, adding another pending network connection to the plurality of pending network connections causes a total of the plurality of pending network connections to exceed a threshold.

113. The apparatus of claim 99, wherein the plurality of pending network connections comprises at least one of a first subplurality and a second subplurality, wherein the first subplurality comprises one or more pending network connections each started in response to one or more handshake messages sent from network nodes with which the first node has successfully handshaked, and the second subplurality comprises one or more pending network connections each started in response to one or more handshake messages sent from network nodes with which the first node has not successfully handshaked.

114. The apparatus of claim 113, wherein the successfully handshaking comprises completing three-way handshaking.

115. The apparatus of claim 113, wherein the means for randomly selecting is at least substantially limited to randomly selecting from the second subplurality.

116. The apparatus of claim 113, wherein the means for randomly selecting is limited to randomly selecting from the second subplurality.

117. The apparatus of claim 113, wherein a total of the plurality of pending network connections exceeds a total of the first subplurality.

118. The apparatus of claim 113, wherein a total of the plurality of pending network connections exceeds a total of the second subplurality.

119. The apparatus of claim 113, wherein a total of the plurality of pending network connections equals a total of the first subplurality.

120. The apparatus of claim 113, wherein a total of the plurality of pending network connections equals a total of the second subplurality.

121. The apparatus of claim 99, wherein the plurality of pending network connections comprises at least one of a first subplurality and a second subplurality, wherein the first subplurality comprises one or more pending network connections each started in response to one or more handshake messages sent from network nodes about which the first node has historical data, and the second subplurality comprises one or more pending network connections each started in response to one or more handshake messages sent from network nodes about which the first node does not have historical data.

122. The apparatus of claim 121, wherein the means for randomly selecting is at least substantially limited to randomly selecting from the second subplurality.

123. The apparatus of claim 121, wherein the means for randomly selecting is limited to randomly selecting from the second subplurality.

124. The apparatus of claim 121, wherein a total of the plurality of pending network connections exceeds a total of the first subplurality.

125. The apparatus of claim 121, wherein a total of the plurality of pending network connections exceeds a total of the second subplurality.

126. The apparatus of claim 121, wherein a total of the plurality of pending network connections equals a total of the first subplurality.

127. The apparatus of claim 121, wherein a total of the plurality of pending network connections equals a total of the second subplurality.

128. The apparatus of claim 99, wherein the plurality of pending network connections comprises at least one of a first subplurality and a second subplurality, wherein the first subplurality comprises one or more pending network connections each started in response to one or more handshake messages sent from network nodes about which the first node has historical data having a first characteristic, and the second subplurality comprises one or more pending network connections each started in response to one or more handshake messages sent from network nodes about which the first node has historical data having a second characteristic.

129. The apparatus of claim 128, wherein the means for randomly selecting is at least substantially limited to randomly selecting from the second subplurality.

130. The apparatus of claim 128, wherein the means for randomly selecting is limited to randomly selecting from the second subplurality.

131. The apparatus of claim 128, wherein a total of the plurality of pending network connections exceeds a total of the first subplurality.

132. The apparatus of claim 128, wherein a total of the plurality of pending network connections exceeds a total of the second subplurality.

133. The apparatus of claim 128, wherein a total of the plurality of pending network connections equals a total of the first subplurality.

134. The apparatus of claim 128, wherein a total of the plurality of pending network connections equals a total of the second subplurality.

135. The apparatus of claim 99, wherein the apparatus successfully handshakes between the first network node and each of a plurality of network nodes, and stores a network identifier of each of the plurality of network nodes.

136. The apparatus of claim 135, wherein successfully handshaking comprises completing three-way handshaking.

137. The apparatus of claim 135, wherein the network identifier comprises an Internet Protocol address.

138. The apparatus of claim 135, wherein the network identifier comprises a Transmission Control Protocol port number.

139. The apparatus of claim 135, wherein the plurality of pending network connections comprises at least one of a first subplurality and a second subplurality, wherein the first subplurality comprises at least one or more pending network connections started in response to a handshake message comprising a network identifier corresponding to a stored identifier, and the second subplurality comprises one or more pending network connections started in response to a handshake message comprising a network identifier not corresponding to a stored identifier.

140. The apparatus of claim 139, wherein the means for randomly selecting randomly selects at least substantially from the second subplurality.

141. The apparatus of claim 139, wherein the means for randomly selecting randomly selects from the second subplurality.

142. The apparatus of claim 139, wherein the network identifier corresponds to the stored identifier if the network identifier maps to the stored identifier.

143. The apparatus of claim 139, wherein the network identifier corresponds to the stored identifier if the stored identifier maps to the network identifier.

144. The apparatus of claim 139, wherein a total of the plurality of pending network connections exceeds a total of the first subplurality.

145. The apparatus of claim 139, wherein a total of the plurality of pending network connections exceeds a total of the second subplurality.

146. The apparatus of claim 139, wherein a total of the plurality of pending network connections equals a total of the first subplurality.

147. The apparatus of claim 139, wherein a total of the plurality of pending network connections equals a total of the second subplurality.

148. A system apparatus for limiting connection resources, comprising:
   a first network node of one or more servers;
   a packet sniffer component coupled to the first network node, wherein the packet sniffer detects a handshake message sent via at least the first network from a second network node toward the first network node;
   a random selection component coupled to the packet sniffer, wherein the random selection component randomly selects one of a plurality of pending network connections at the first network node, and the plurality of pending network connections are started in response to a plurality of handshake messages sent toward the first network node via at least a second network; and
   a sending component coupled to the first network node, wherein the sending component sends a message to end the randomly selected pending network connection.

* * * * *